Patented Mar. 4, 1947

2,416,701

UNITED STATES PATENT OFFICE 2,416,701

REFRACTORY CONCRETE

Daniel W. Kocher, Chicago, Ill., assignor, by mesne assignments, to Universal Atlas Cement Company, Indianapolis, Ind., a corporation of Indiana No Drawing. Application August 26, 1944, Serial No. 551,448

19 Claims. (Cl. 106—64)

This invention relates to an improved refractory, more particularly a refractory concrete of which an essential component is calcium silicate cement.

One of the objects of the invention is the improvement in strength of refractory materials of the type described. Another object is the improvement in the load-bearing characteristics of such refractory when heated at elevated temperatures. These and further objects of the invention will further appear as the description of the invention proceeds.

Refractory materials or concretes composed of calcium silicate and various refractory aggregates have been employed with indifferent success in applications where they are subjected to moderately high temperatures. Calcium silicate cements, when mixed with water, form certain hydrated compounds. When heated, these hydrated compounds lose appreciable portions of the combined water, which results in reduced strength. This loss of combined water increases with increase in temperature until at some temperature above 1600° F. all combined water is driven off and no hydraulic strength is present. When calcium silicate cements are used as binders for refractory aggregates, the resulting concrete likewise loses strength upon heating. However, at temperatures in the vicinity of 1600° F. some of the low melting compounds in the cements combine with the aggregate to form a ceramic bond resulting in increased strength. This ceramic strength increases with increase in temperature until the softening point of the particular concrete mixture is reached.

In refractory materials of appreciable thickness, which employ a calcium silicate cement as the binder, wherein one face is subjected to temperatures on the order of 2000° F. the outer face of the material may never be heated above temperatures in the order of 500° F. Intermediate portions of the refractory will be subjected to temperatures depending upon their distances from the hotter face. It has been found that whereas the hot zone of the refractory, which has been subjected to temperatures in the order of 2000° F., possesses adequate strength, due to the development of a good ceramic bond, and the cold zone has good strength, since the cement in such zone still possesses a considerable portion of its hydraulic strength, due to the relatively low temperature to which it is subjected, an intermediate zone of the refractory is weaker than either the hot or cold zones due to the marked impairment in the hydraulic strength without the development of any substantial ceramic strength.

The use of a mix in accordance with the present invention for making refractory materials of the type described decreases the intermediate weak zone area to such a degree that it is eliminated when a panel 4½" thick is subjected to a temperature of 2000° F. on one face for eight hours, and is materially decreased in wall sections of greater thickness when subjected to higher temperatures or for a greater length of time.

This invention consists in the addition of topaz, either raw or partly calcined, to calcium silicate cement mixtures in the formation of refractory materials. Refractory material within the scope of the present invention may consist of topaz and calcium silicate cement, or it may consist of these materials plus other refractory materials which may be in the form of aggregates.

The refractory concrete of the present invention is made from a mix the constituents of which lie within the following limits of per cent by weight of the total weight of the mix:

| | Per cent |
|---|---|
| Topaz, raw or partly calcined | .5–95 |
| Calcium silicate cement | 5 –60 |
| E. g. refractory filler, refractory aggregate | .0–94.5 |

Calcium silicate cement is a cement in which the predominant compounds that furnish the hydraulic strength to the mixture are calcium silicates. Examples are Portland cements, Portland-blast furnace slag cements, Portland pozzuolan cements, true pozzuolanic cements, slag cements, and natural cements.

"Portland cement" may be defined as the product obtained by pulverizing clinker consisting essentially of hydraulic calcium silicates, to which no additions have been made subsequent to calcination other than water and/or untreated calcium sulfate. The following Portland cement having the following composition, by weight, is typical

| | Per cent |
|---|---|
| $CaO$ | 63–65 |
| $SiO_2$ | 20–22 |
| $Al_2O_3$ | 5 –7 |
| $Fe_2O_3$ | Up to 4.5 |
| $MgO$, alkalies and minor constituents | Balance |

The "Portland-blast furnace slag cement," as that term is used herein, is made by grinding together Portland cement clinker and granulated blast furnace slag.

The "Portland pozzuolan cements," as that term is used herein, are produced by grinding together Portland cement clinker and either a natural or artificial pozzuolana.

The "true pozzuolanic cements," as that term is used herein, are composed of lime and granulated slag such as volcanic cinders or blast furnace slag, mixed without heating. A typical cement of this type is made by mixing hydrated lime with slag from an iron blast furnace, said slag having been quenched suddenly in water to leave the slag in a glassy non-crystalline form. The resulting lime-slag mixture is ground to a fine powder and is then ready for use.

The "slag cement," as that term is used herein, is a mixture of hydrated lime and granulated blast furnace slag. Certain additions may be added to accelerate the set.

The "natural hydraulic cements," as that term is used herein, are those made by calcining argillaceous limestones at temperatures only so high as to expel the combined $CO_2$ and $H_2O$. The calcareous portion of such argillaceous limestones may consist of $CaCO_3$ essentially, or of Ca and Mg carbonates combined in various proportions up to that represented by the mineral dolomite, $CaMg(CO_3)_2$.

By "partly calcined topaz" as used above is meant a topaz which has been heated in such manner that at least 1% by weight fluorine remains in the topaz.

The constituents of the mix are supplied thereto in either comminuted or granular form to allow them to be uniformly distributed through the mix and consequently the resulting concrete. Those constituents which form the bond are preferably finely ground to facilitate their reaction. The calcium silicate cement, for example, may be of such fineness that practically all particles will pass through a one hundred mesh screen, and the topaz may be ground to any particle size. The refractory filler, which may be fire clay grog, crushed firebrick, expanded shale, olivine, fused alumina, chrome, magnesite, vermiculite, diatomaceous earth and the like or combinations of these materials depending upon the use to which the refractory concrete is to be put, may be of any desired particle size or range of particle sizes consistent with substantial uniformity of distribution throughout the resulting concrete. Naturally, also, in concrete of thinner section the aggregate particle size will be chosen smaller than in concrete of thick section. An aggregate useful in moderately thick sections is one having particles from 1½″ in diameter to dust, 50% by volume passing through a ⅛″ screen and 50% by volume being retained on a ⅛″ screen, approximately 15% by volume of the total passing a one hundred mesh screen. For concrete of thinner sections the maximum permissible particle size will obviously be smaller. The mix may conveniently be made by mixing the calcium silicate cement and the topaz in dry condition to a uniform color, the refractory aggregate being thoroughly wet down with water and then added to the calcium silicate cement and topaz mixture. Sufficient water is added to the resulting mixture to render it workable, the amount added depending upon the manner in which the mix is to be subsequently handled in the formation of the concrete shape or structure. Thus, if the concrete is to be cast into a mold or form, particularly if the shape is intricate, the mix should be of puddling consistency. For simple shapes so cast, less water may be used, whereas if the mix is to be tamped or vibrated into place or molded under pressure, still less water may be used. It is obvious that sufficient water should be used in all cases to develop fully the hydraulic strength of the cement and that an excess of water should be avoided. Besides the variations in modes of handling the mix above indicated, it is possible to deposit it in a mold or form or in any desired location, as for instance, in the applying of patches to existing structures, by charging the mix into a cement gun which pumps or otherwise forces it out through a discharge orifice.

After the mixture has been shaped or molded in any one of the ways above described, it is dried and then heated. Usually for bodies of large section, the practice follows approximately that employed in drying and heating newly constructed firebrick linings. The concrete may be air dried for a period of several days, after which the section is heated at temperatures which gradually increase up to operating temperature.

Smaller bodies or shapes, such as cast bricks, tiles and slabs may be kept for a time, on the order of seventy-two hours in a high humidity-constant temperature atmosphere, dried at a low temperature, on the order of 230° F., and then subjected to a high temperature approximating that at which the shape will be used, for example, 1600–2000° F.

Concrete resulting from mixes made in accordance with the present invention, after having been dried and heated as above, possesses increased strength and improved load bearing characteristics compared to similar concretes made from mixes containing no topaz. The increased strength and load bearing qualities at room temperatures of concrete within the scope of the present invention are strikingly shown by the following tables, which give the compressive strengths of two-inch cubes made of a base mixture of one part by volume of various calcium silicate cements of the type indicated, and four parts by volume of an aggregate, specifically crushed fire brick, and the compressive strengths of similar cubes made of the same base mixture but with one part by volume of topaz added thereto.

The mix was made of a puddling consistency and cast into two-inch cube molds. After treatment in a moist cabinet, drying at 230° F., and firing for four days at 1600° F. with one set and for four days at 2000° F. with the other set, the cubes were allowed to cool. After cooling, each cube was subjected to a compressive strength test at room temperature by subjecting it to gradually increasing pressure until a point of failure of the cube was reached.

In the following tables the cement designated #1 is a standard Portland cement. The cement designated #2 is a pozzuolanic Portland cement, and that designated #3 is a slag cement. The compositions given are by per cent of the total volume and weight, respectively, of the mix.

*Compressive strength*

[Fired at 1600° F.]

| Composition No. | Composition | | Compressive strength, p. s. i. |
|---|---|---|---|
| | By volume | By weight | |
| 1 | Cement #1 ---- 1<br>Aggregate ---- 4 | 1.0<br>3.4 | 998 |
| 2 | Cement #1 ---- 1<br>Aggregate ---- 4<br>Topaz ---- 1 | 1.0<br>3.4<br>0.755 | 1,111 |
| 3 | Cement #2 ---- 1<br>Aggregate ---- 4 | 1.0<br>3.4 | 611 |
| 4 | Cement #2 ---- 1<br>Aggregate ---- 4<br>Topaz ---- 1 | 1.0<br>3.4<br>0.755 | 1,108 |
| 5 | Cement #3 ---- 1<br>Aggregate ---- 4 | 1.0<br>3.4 | 132 |
| 6 | Cement #3 ---- 1<br>Aggregate ---- 4<br>Topaz ---- 1 | 1.0<br>3.4<br>0.755 | 558 |

*Compressive strength*

[Fired at 2000° F.]

| Composition No. | Composition | | Compressive strength, p. s. i. |
| --- | --- | --- | --- |
| | By volume | By weight | |
| 1 | Cement #1 ___ 1<br>Aggregate ___ 4 | 1.0<br>3.4 | 603 |
| 2 | Cement #1 ___ 1<br>Aggregate ___ 4<br>Topaz ___ 1 | 1.0<br>3.4<br>0.755 | 3,717 |
| 3 | Cement #2 ___ 1<br>Aggregate ___ 4 | 1.0<br>3.4 | 1,392 |
| 4 | Cement #2 ___ 1<br>Aggregate ___ 4<br>Topaz ___ 1 | 1.0<br>3.4<br>0.755 | 4,600 |
| 5 | Cement #3 ___ 1<br>Aggregate 4 ___ 4 | 1.0<br>3.4 | 1,218 |
| 6 | Cement #3 ___ 1<br>Aggregate ___ 4<br>Topaz ___ 1 | 1.0<br>3.4<br>0.755 | 3,969 |

Such increased strengths at room temperature of refractory products within the scope of the present invention are paralleled by their increase in strength when at temperatures on the order of 1600–2000° F.

The reason why refractory concretes employing topaz with calcium silicate cement in accordance with the present invention yield such increased hot and cold strengths, as compared to similar concretes, similarly treated, but without topaz, is not fully understood. It has been observed, however, that when concrete mixes containing topaz, whether raw or partly calcined, are heated to at least 1400° F., substantial amounts of fluorine are given off.

The reaction of topaz alone when subjected to heating at temperatures of such order or above is as follows:

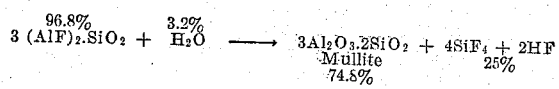

One theory of the reaction is that the fluorine or HF present in the concrete as a result of the dissociation of topaz upon heating to at least 1400° F. may catalyze reactions in the concrete, causing reactions to occur at lower temperatures than they would without such fluorine or HF, or causing reactions which would never occur without either or both. Again, it may be that the SiF₄ released reacts with oxygen to produce colloidal silica which is deposited in the interstices of the body, thereby producing the hard and strong bond material. It is believed that the water of hydration driven off from the cement upon firing of the bodies may also play a part as a catalyst, either alone or in combination with the products of topaz, to produce the improved bond.

In any event, it is possible to produce the improved refractory concrete of the present invention by heating the concrete resulting from mixtures of calcium silicate cement and refractory aggregate, but without topaz, in an atmosphere containing the volatile materials produced upon the heating of topaz to elevated temperatures. One way in which this may be done, in practice, with smaller bodies or shapes such as bricks, slabs, and tiles, is to heat such shapes in a muffle furnace with a quantity of topaz in a crucible likewise placed in the muffle. In such case improvement of the bond results as a result of diffusion of the volatile materials given off by the topaz into the concrete. In the case of large bodies or shapes, such as those cast or shaped in situ and forming a permanent part of the structure, the part may be heated preparatory to being placed in service, by its own or by an auxiliary heating means, and an atmosphere of the volatile products of topaz upon heating thereof provided in contact with the concrete as by placing topaz in proximity to the concrete during the heating. Any appreciable amount of topaz, in such improvement of large or small concrete shapes by diffusion, from a small fraction of one per cent of the total mass of the shape upwards, results in improvement of the strength of shape. The improvement in refractory concrete employing calcium silicate cements may also be attained, after the concrete has been in service, by the diffusion into it at elevated temperature of the volatile products given off by topaz when heated to at least 1400° F.

Whereas particular embodiments of the invention have been described above for purposes of illustration, it will be evident that numerous variations of details are possible within the teaching of the invention. I desire to claim as new the following.

I claim:

1. A mix for forming refractory concrete comprising calcium silicate cement from .5 to 60% by weight of mix and topaz containing at least 1% by weight of fluorine from .5 to 95% by weight of the mix.

2. A mix for forming refractory concrete comprising calcium silicate cement from 5 to 60% by weight of the mix, topaz containing at least 1% by weight of fluorine from .5 to 95% by weight of the mix, and refractory aggregate up to 94.5% by weight of the mix.

3. A mix for forming refractory concrete comprising from 5 to 60% by weight of the mix of a cement composed essentially of calcium silicate and topaz containing at least 1% by weight of fluorine from .5 to 95% by weight of the mix.

4. A mix for forming refractory concrete comprising Portland cement from 5 to 60% by weight of the mix, topaz containing at least 1% by weight of fluorine from .5 to 95% by weight of the mix, and refractory aggregate up to 94.5% by weight of the mix.

5. A refractory concrete formed from a mix comprising calcium silicate cement from 5 to 60% by weight of the mix and topaz containing at least 1% by weight of fluorine from .5 to 95% by weight of the mix.

6. A refractory concrete formed from a mix comprising calcium silicate cement from 5 to 60% by weight of mix, topaz containing at least 1% by weight of fluorine from .5 to 95% by weight of the mix, and refractory aggregate up to 94.5% by weight of the mix.

7. A refractory concrete formed from a mix comprising from 5 to 60% by weight of the mix of a cement composed essentially of calcium silicate, topaz containing at least 1% by weight of fluorine from .5 to 95% by weight of the mix, and refractory aggregate up to 94.5% by weight of the mix.

8. A refractory concrete body formed from a mix comprising Portland cement from 5 to 60% by weight of the mix, topaz containing at least 1% by weight of fluorine from .5 to 95% by weight of the mix, and refractory aggregate up to 94.5% by weight of the mix.

9. A refractory concrete body formed from a mix comprising calcium silicate cement from 5 to 60% by weight of the mix and topaz containing at least 1% by weight of fluorine from .5 to 95% by weight of the mix, at least one portion of said body having been subjected to a temperature of at least 1600° F. for a sufficient length of time so that the reaction of the topaz will compensate for the loss of hydraulic strength.

10. A refractory concrete body formed from a mix comprising calcium silicate cement from 5 to 60% by weight of the mix, topaz containing at least 1% by weight of fluorine from .5 to 95% by weight of the mix, and refractory aggregate up to 94.5% by weight of the mix, at least one portion of said body having been subjected to a temperature of at least 1600° F. for such a time that the reaction of the topaz will compensate for the loss of hydraulic strength.

11. A refractory concrete body formed from a mix comprising from 5 to 60% by weight of the mix of a cement composed predominantly of calcium silicate, topaz containing at least 1% by weight fluorine from .5 to 95% by weight of the mix, and refractory aggregate up to 94.5% by weight of the mix, at least one portion of the body having been subjected to a temperature of at least 1600° F. for such a time that the reaction of the topaz will compensate for the loss of hydraulic strength.

12. A refractory concrete body formed from a mix comprising Portland cement from 5 to 60% by weight of the mix, topaz containing at least 1% by weight of fluorine from .5 to 95% by weight of the mix, and refractory aggregate up to 94.5% by weight of the mix, at least one portion of said body having been subjected to a temperature of at least 1600° F. for such a time that the reaction of the topaz will compensate for the loss of hydraulic strength.

13. A refractory concrete body formed from a mix comprising calcium silicate cement from 5 to 60% by weight of the mix, topaz containing at least 1% by weight of fluorine from .5 to 95% by weight of the mix, and refractory aggregate up to 94.5% by weight of the mix, at least one portion of said body having been subjected to a temperature of at least 2000° F. for such a time that the hydraulic strength of said fired portion has been substantially destroyed, said fired portion of the body consisting of refractory aggregate bonded by a ceramic bond consisting of a hard, strong material which is due to the action of topaz on the mixture.

14. The method of making refractory concrete which comprises heating a shape resulting from a mix comprising calcium silicate cement from 5 to 60% by weight of the mix and subjecting it to contact with the volatile materials given off by the heating of topaz at a temperature of at least 1600° F.

15. A method of making refractory concrete which comprises forming a mix comprising calcium silicate cement from 5 to 60% by weight of the mix and refractory aggregate up to 94.5% by weight of the mix, developing a hydraulic bond in the resulting concrete body, installing such body for service, and in the initial firing of the body subjecting it to contact with the volatile materials given off by topaz when heated to at least 1600° F.

16. The method of treating a refractory concrete body after it has been subjected to temperatures of at least 1400° F. for an appreciable length of time, said concrete body having been formed from a mix comprising calcium silicate cement from 5 to 60% by weight of the mix and refractory aggregate up to 94.5% by weight of the mix, which comprises heating said body and subjecting it to contact with the volatile material given off by topaz when heated to at least 1600° F.

17. The method of making refractory concrete bodies which comprises forming a mix comprising calcium silicate cement from 5 to 60% by weight of the mix, topaz containing at least 1% by weight of fluorine from .5 to 95% by weight of the mix, and refractory aggregate up to 94.5% by weight of the mix, forming a body from such mix, developing the hydraulic strength of said body to at least a substantial part of the total hydraulic strength which is possible for said body to attain, and then firing at least one portion of said body at a temperature of at least 1600°, whereby at least a portion of the volatile material of the topaz is released, resulting in the fired portion of said body developing a hard, strong, refractory ceramic bond.

18. The method of making refractory concrete bodies which comprises forming a mix comprising calcium silicate cement from 5 to 60% by weight of the mix, topaz containing at least 1% by weight of fluorine from .5 to 95% by weight of the mix, and refractory aggregate up to 94.5% by weight of the mix, forming a body from such a mix, developing the hydraulic strength of said body to at least a substantial part of the total hydraulic strength which is possible for said body to attain, and then firing at least one portion of said body at a temperature of at least 2000° F. whereby at least a portion of the volatile material of the topaz is released resulting in the fired portion of said body developing a hard, strong, refractory ceramic bond.

19. The method of making refractory concrete bodies which comprises forming a mix comprising Portland cement from 5 to 60% by weight of the mix, topaz containing at least 1% by weight of fluorine from .5 to 95% by weight of the mix, and refractory aggregate up to 94.5% by weight of the mix, forming a body from such mix, developing the hydraulic strength of said body to at least a substantial part of the total hydraulic strength which is possible for said body to attain, and then firing at least one portion of said body at a temperature of at least 2000° F., whereby at least a portion of the volatile material of the topaz is released, resulting in the fired portion of said body developing a hard, strong, refractory ceramic bond.

DANIEL W. KOCHER.

REFERENCES CITED

The following references are of record in the file of this patent:

UNITED STATES PATENTS

| Number | Name | Date |
| --- | --- | --- |
| 1,156,018 | Newberry | Oct. 5, 1915 |
| 2,331,232 | Ross | Oct. 5, 1943 |
| 2,347,968 | Ross | May 2, 1944 |

FOREIGN PATENTS

| Number | Country | Date |
| --- | --- | --- |
| 152,459 | German | 1904 |